United States Patent
Janky

(10) Patent No.: US 6,198,432 B1
(45) Date of Patent: Mar. 6, 2001

(54) METHOD AND APPARATUS FOR AUTOMATIC AND AUTONOMOUS ASSIGNMENT OF PRN CODES TO A MULTIPLICITY OF PSEUDOLITES

(75) Inventor: James M. Janky, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/409,023

(22) Filed: Sep. 29, 1999

(51) Int. Cl.$^7$ .......................................... G01S 1/08
(52) U.S. Cl. .................. 342/357.14; 342/357.06
(58) Field of Search .................. 342/357.03, 357.14, 342/386, 357.06, 357.09, 357.15

(56) References Cited

U.S. PATENT DOCUMENTS 5,311,194 * 5/1994 Brown ........................... 342/357.03
5,440,491 * 8/1995 Kawano et al. ................ 342/357.06

OTHER PUBLICATIONS

Stansell, Jr., Thomas, "RTCM SC–104 Recommended Pseudolite Signal Specification", Navigation, vol. III, 1986.*

* cited by examiner

Primary Examiner—Gregory C Issing
(74) Attorney, Agent, or Firm—David R. Gildea

(57) ABSTRACT

A pseudolite for transmitting a global positioning system (GPS) signal having identification information for a GPS satellite that is currently out-of-view. The pseudolite mimics a global positioning system (GPS) signal by using a C/A pseudorandom (PRN) identification code for a GPS satellite that is allocated in the GPS system but is unreceivable in the local vicinity and location-determination information including ephemeris data corresponding to the geographical location of the pseudolite. In order to ensure that two of the GPS pseudolites in the same vicinity do not use the identification PRN code from the same out-of-view GPS satellite, the pseudolite listens first before transmitting to detect the identifications in the received GPS signals.

18 Claims, 3 Drawing Sheets

| PRN NO. | SLOT | PRN NO. | SLOT |
| --- | --- | --- | --- |
| 1 | F1 | 17 | D3 |
| 2 | B3 | 18 | F3 |
| 3 | C2 | 19 | A4 |
| 4 | D4 | 20 | NON-OPERATIONAL |
| 5 | B4 | 21 | E2 |
| 6 | C1 | 22 | B1 |
| 7 | C4 | 23 | E4 |
| 8 | A5 | 24 | D1 |
| 9 | A1 | 25 | A2 |
| 10 | E3 | 26 | F2 |
| 11 | NON-OPERATIONAL | 27 | A3 |
| 12 | NON-OPERATIONAL | 28 | NON-OPERATIONAL |
| 13 | F5 | 29 | F4 |
| 14 | E1 | 30 | B2 |
| 15 | D2 | 31 | C3 |
| 16 | E5 | 32 | NON-OPERATIONAL |

Fig. 3

METHOD AND APPARATUS FOR AUTOMATIC AND AUTONOMOUS ASSIGNMENT OF PRN CODES TO A MULTIPLICITY OF PSEUDOLITES

BACKGROUND OF THE INVENTION

1. Field of the Invention

The invention relates generally to pseudolites for satellite positioning systems and more particularly to a pseudolite for transmitting a positioning system signal having identification information corresponding to a positioning system satellite that is currently out-of-view.

2. Description of the Prior Art

The global positioning system (GPS) operated by the United States government uses microwave transmissions from orbiting satellites with known orbits. These transmissions are received by a satellite navigation receiver for determining the location of the receiver. Such microwave frequencies are blocked by the earth or by local obstructions such as buildings. Locating the receiver in an urban city block or inside a building can severely limit performance by excluding necessary satellites from a constellation being tracked.

Each of the GPS satellites transmits a GPS signal on the same carrier frequency modulated by location-determination information from that GPS satellite and spread by pseudo-random (PRN) codes that are distinct for that GPS satellite. Two different PRN codes are used by each satellite: a long code termed the precise/encrypted (P/Y) code and a short code of 1023 bits or chips termed the coarse/acquisition (C/A) code. Either the P/Y code or the C/A code identifies the GPS satellite transmitting the GPS signal and enables a GPS navigation receiver to distinguish the GPS signal from one GPS satellite from the GPS signal from another GPS satellite. The P/Y code is encrypted and restricted for use to those authorized by the United States Department of Defense while knowledge of the C/A code is available to all users.

There are over one thousand distinct C/A PRN codes that could be used for identification for distinguishing the GPS satellites of these C/A PRN codes, the United States government has currently allocated about thirty-two for use by GPS satellites. Existing GPS receivers are designed to search for GPS signals from GPS satellites having any one of these codes. Of these thirty-two allocated satellites, currently about twenty-seven are orbiting and operational and five are not operational. Typically, of the orbiting operational satellites, in mid-latitudes about one-third will be above the Earth horizon and potentially receivable by a GPS receiver and about two-thirds will be unreceivable to the receiver by being below the horizon. Therefore, about twenty-three of the satellites will not be receivable for use by the GPS receiver.

Existing GPS applications use pseudolites to augment the satellite constellation and thus improve availability of the GPS signal. Such pseudolites mimic the satellite transmissions by broadcasting pseudo GPS signals, but are fixed on the ground and transmit the location-determination information appropriate to the geographical location of the pseudolite. The pseudolites make use of PRN codes that have not been allocated for GPS satellites. Signal reception is nearly guaranteed when the pseudolite is located nearby due to relatively higher signal strength of the received pseudo GPS signal. In addition to the thirty-two PRN codes allocated for GPS satellites the United States government currently allocates about four codes for the use of pseudolites. For example, a pair of pseudolites at the end of an airport's runway are conventionally used to enhance the position determination of a navigational receiver in a landing aircraft. It has been proposed that several pseudolites be used in a metropolitan area in order to improve GPS service in urban canyons and inside of buildings.

Fast GPS signal acquisition is important in applications for many GPS navigation receivers. For example, a battery powered receiver alternating between operational and standby modes needs a fast acquisition in order to have good battery life with small batteries. One technique for achieving a fast acquisition is to minimize the number of PRN codes or other types of identifications that are searched in order to acquire GPS signals. However, a requirement for more than four pseudolites increases the number PRN codes that must be stored or generated in a GPS receiver, thereby slowing signal acquisition time in certain circumstances.

There is a need for a pseudolite using a PRN code identification that minimizes the number of PRN codes that must be stored for search in a GPS receiver. Further, there is a need for an autonomous assignment procedure that simplifies and automates the choosing process, especially when there are a multiplicity of pseudolites to be installed, and the pseudolites could be supplied by different manufacturers.

SUMMARY OF THE INVENTION

It is therefore an object of the present invention to provide a positioning system (PS) pseudolite for a satellite positioning system where the PS pseudolite transmits a pseudo PS signal using a PS satellite identification for a PS satellite that is allocated for the positioning system but is currently unreceivable in the vicinity of the PS pseudolite.

The PS pseudolite of the present invention operates autonomously and independently from any central authority for determining which particular one of the unreceivable PS satellite identifications is used for transmitting a pseudo PS signal.

Briefly, in a preferred embodiment, a positioning system (PS) pseudolite of the present invention is a global positioning system (GPS) pseudolite. The GPS pseudolite mimics a global positioning system (GPS) signal by using a C/A pseudorandom (PRN) identification code for a GPS satellite that is allocated in the GPS system but is A unreceivable in the local vicinity because it is below the local horizon in its orbit. The pseudolite transmits location-determination information including ephemeris data corresponding to the geographical location of the pseudolite. In order to ensure that two of the GPS pseudolites in the same vicinity do not use the identification PRN code from the same unreceivable GPS satellite, each GPS pseudolite listens first before transmitting to detect the identifications in the received GPS signals and uses PRN codes that are not being received. This autonomous code assignment process is independent of any central authority so that multiple vendors can supply pseudolites even in the same local area.

The GPS pseudolite includes a satellite availability calculator including a visibility calculator and an operational identifier. The visibility calculator uses GPS satellite almanac and/or ephemeris orbital parameter data for determining the GPS satellites that are in-view having a line-of-sight to the GPS pseudolite and the GPS satellites that are out-of-view, for example behind the Earth. The operational identifier determines the GPS satellites that are operational and those that are non-operational. Non-operational GPS satellites include those GPS satellites that have not been launched or have been turned off. The GPS satellites that are both operational and in-view are designated as receivable GPS satellites. The GPS satellites that are either out-of-view or non-operational are designated as unreceivable GPS satellites. The GPS pseudolite further includes a GPS receiver, a pseudolite detector, a satellite identification selector, and a pseudolite GPS transmitter. The GPS receiver receives GPS signals from the receivable GPS satellites and pseudo GPS signals from other GPS pseudolites in the vicinity and passes the received identifications to the pseudolite detector. The pseudolite detector detects that another GPS pseudolite in the vicinity is transmitting when a received identification matches the identification of an unreceivable GPS satellite. The satellite identification selector selects an available identification that both corresponds to one of the unreceivable GPS satellites and is not currently being used by another GPS pseudolite. The pseudolite transmitter then transmits a pseudo GPS signal having the selected available PRN code identification.

An advantage of the PS pseudolite of the present invention for a positioning system is that the PS pseudolite re-uses identifications that have been allocated for positioning system satellites, thus reducing the search time for a remote GPS receiver to acquire a pseudolite transmission.

Another advantage of the PS pseudolite of the present invention is that no coordination is needed by either manufacturers or system integrators with regard to selection of unique and independent identifications.

These and other objects and advantages of the present invention will no doubt become obvious to those of ordinary skill in the art after having read the following detailed description of the preferred embodiments which are illustrated in the various figures.

BRIEF DESCRIPTION OF THE DRAWINGS

FIG. 3 is a table of allocated GPS satellites for the global positioning system of FIG. 1.

DETAILED DESCRIPTION OF THE PREFERRED EMBODIMENTS

Figure 1:
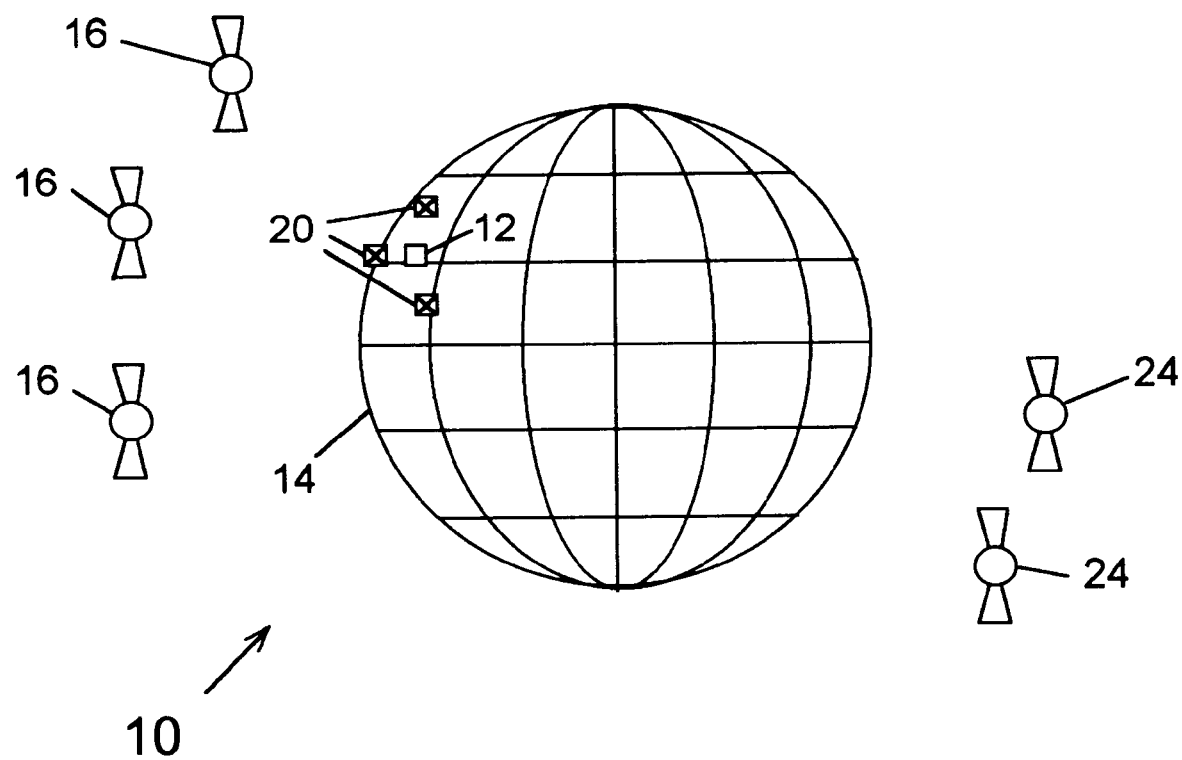
FIG. 1 illustrates a global positioning system (GPS) having a GPS pseudolite of the present invention.

FIG. 1 illustrates an autonomous code assignment pseudolite system of the present invention referred to by the general reference number 10. The system 10 includes a global positioning system (GPS) navigation receiver 12 on or near the Earth 14 for receiving GPS signals from in-view GPS satellites 16 having a line-of-sight to the receiver 12 and pseudo GPS signals from one or more nearby GPS pseudolites 20 of the present invention. The GPS navigation receiver 12 uses the GPS signals and pseudo GPS signals for determining its geographical location and time. Although only one GPS navigation receiver 12 is shown in FIG. 1, it is envisioned that the system 10 may include several GPS navigation receivers 12. Of course, the GPS navigation receivers 12 may be used for application that are not strictly navigation, such as surveying, mapping, event tagging, and the like where location, velocity and/or time is required.

Out-of-view GPS satellites 24 not having a line-of-sight to the GPS navigation receiver 12 are typically not receivable by the receiver 12 because their GPS signals are blocked by the Earth 14. The in-view GPS satellites 16 orbit the Earth 14 in a period of approximately twelve hours so that each of the in-view GPS satellites 16 periodically sets below the horizon of the Earth 14 and becomes an out-of-view GPS satellite 24, then rises to become an in-view GPS satellite 16, and so on. Similarly, each of the out-of-view GPS satellites 24 periodically rises above the horizon of the Earth 14 and becomes an in-view GPS satellite 16, then sets to become an out-of-view GPS satellite 24, and so on.

The GPS signal is formatted according to GPS specifications for carrying satellite identification information and location-determination information. A written source of such GPS specifications is available from ARINC Research Corporation of El Segundo, Calif. under the title of "GPS Interface Control Document ICD-GPS-200, NAVSTAR GPS Space Segment and Navigation User Interfaces" revised in Sep. 25, 1997.

Briefly, the GPS signal has an L-band carrier signal modulated by GPS data bits of twenty milliseconds that are spread by a pseudorandom (PRN) code that repeats every one millisecond. The GPS data bits and the PRN codes of all the GPS signals are synchronized to transmit at the same times beginning with 00 hours, 00 minutes, 00.000 seconds of each GPS week and continuing throughout the week. The PRN code in each GPS signal is distinct, thereby allowing a GPS is receiver to use the PRN code as identification information for distinguishing the GPS signal from one GPS signal source from the GPS signal from another GPS signal source. The United States government has allocated about thirty-two of these PRN codes for current use in the global positioning system. However, about five GPS satellites are currently non-operational, and therefore, unreceivable because they have not been launched or have been decommissioned. The particular PRN codes that are operational varies over time as old GPS satellites are retired and new ones are launched.

The GPS data bits carry location-determination information segmented into 1500 bit frames, also called pages, of thirty seconds. The frames are segmented into five 300 bit subframes of six seconds each. The subframes are segmented into thirty 10 bit words. Each subframe begins with a known preamble and includes a Z-count. The Z-count gives GPS-based time-of-transmission for the preamble. Subframes two and three the GPS signal from the GPS satellites 16, 24 and the GPS pseudolite 20 includes ephemeris data for the GPS satellite 16, 24 or the GPS pseudolite 20 transmitting that GPS signal. The ephemeris data is highly accurate and is updated about hourly.

The ephemeris data for the GPS satellites 16, 24 describes the current orbital parameters for the motion of the GPS satellites 16, 24 through space. The GPS navigation receiver 12 uses the ephemeris data along with the GPS based-time for determining the time-variable locations-in-space for the in-view GPS satellites 16 whose GPS signals are received and processed. The ephemeris data for the GPS pseudolite 20 uses the same format for describing a ground-fixed location of the GPS pseudolite 20 that has been determined with a survey. In a preferred embodiment, the GPS navigation receiver 12 determines the fixed location of the GPS pseudolite 20 in a similar way as for the locations-in-space of the in-view GPS satellites 16. Alternatively, because the ephemeris data describes a fixed location, the GPS navigation receiver 12 can determine the location of the GPS pseudolite 20 without first determining a GPS-based time. With the four or more of the locations-in-space for the in-view GPS satellites 16 and/or the locations of the GPS pseudolites 20, the GPS navigation receiver 12 can determine its own geographical location. Fewer than four in-view GPS satellites 16 and/or GPS pseudolites 20 are required when other navigation information such as an accurate time, inertial information, map matching, or altitude is available. More than four in-view GPS satellites 16 and/or GPS pseudolites 20 are useful for improving the accuracy of the location.

Although the preferred embodiment is described in terms of the global positioning system the elements and methods of the present invention are applicable to other satellite positioning systems such as the global orbiting navigational system (GLONASS). GLONASS satellites transmit GLONASS signals having the same pseudorandom code that are identified by distinct carrier frequencies. A comparable GLONASS pseudolite system would use transmission frequencies based on those used by out-of-view or non-operation GLONASS satellites.

Figure 2:
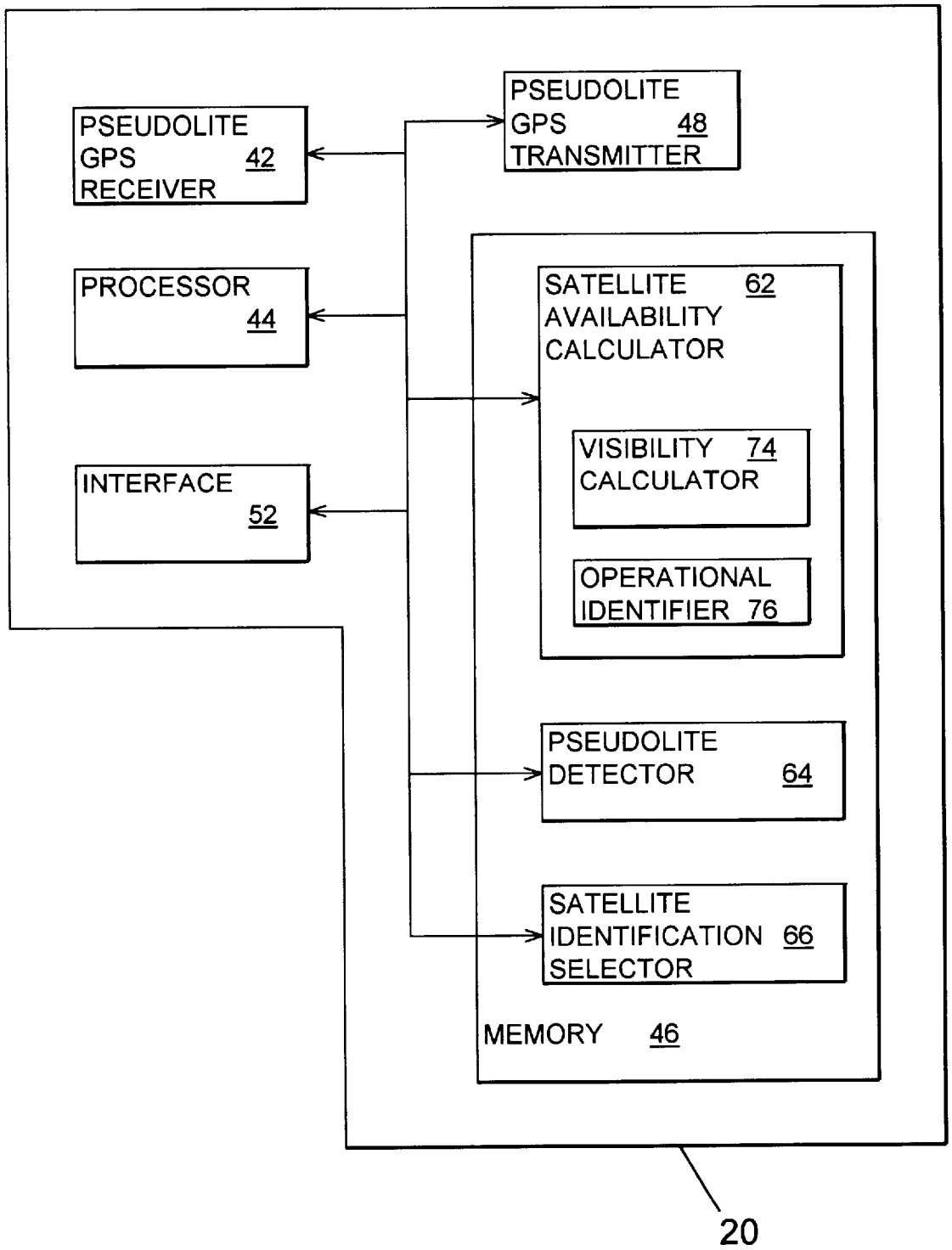
FIG. 2 is a block diagram of the GPS pseudolite of the global positioning system of FIG. 1.

FIG. 2 is a block diagram of the pseudolite of the resent invention referred to by the general reference umber 20. The pseudolite 20 includes a pseudolite GPS receiver 42, a processor 44, a memory 46, a pseudolite GPS transmitter 48, and an interface 52. The GPS receiver 42 receives GPS signals from the in-view GPS satellites 16 (FIG. 1) and the other GPS pseudolites 20 (FIG. 1) and passes information to the processor 44 for GPS-based time, the GPS satellite almanac and/or ephemeris orbital parameters, and the identifications of the satellite and pseudo GPS signals that are being received. In general, the identifications include the identifications corresponding to the in-view GPS satellites 16 transmitted by the in-view GPS satellites 16, and the identifications for the out-of-view GPS satellites 24 and non-operational GPS satellites (FIG. 3) transmitted by the other pseudolites 20. The processor 44 operates in a conventional manner for reading and writing data into the memory 46 and executing program codes in the memory 46 for receiving information and controlling the elements of the GPS pseudolite 20 including the GPS receiver 42, the pseudolite transmitter 48, and the interface 52. Preferably, the stored data in the memory 46 includes information for a fixed ground-based geographical location of the GPS pseudolite 20. Alternatively, the GPS receiver 42 may be a survey grade GPS receiver equipped for real time operation for providing and updating a precise geographical location for the pseudolite 20.

The memory 46 includes program codes for a satellite availability calculator 62, a pseudolite detector 64, and a satellite identification selector 66. The satellite availability calculator 62 includes a visibility calculator 74 and an operational identifier 76. The visibility calculator 74 uses the GPS satellite almanac or ephemeris orbital parameters for determining the in-view GPS satellites 16 having a line-of-sight to the GPS pseudolite 20 and the out-of-view GPS satellites 24 where the line-of-sight is blocked by the Earth 14 (FIG. 1). The visibility calculator 74 can be programmed with the coordinates and heights of local obstructions such as the walls of an open mine, a building, or a mountain range for differentiating in-view GPS satellites 16 from out-of-view GPS satellites 24.

The operational identifier 76 uses the satellite orbital parameters and optionally uses information received through the interface 52 that is provided by the United States government for determining the identifications for the orbiting operational GPS satellites 16, 24 and the non-operational GPS satellites (FIG. 3). The satellite availability calculator 62 designates the in-view GPS satellites 16 that are operational as receivable GPS satellites. The out-of-view GPS satellites 24 and the non-operational GPS satellites (FIG. 3) are designated as unreceivable GPS satellites. The pseudolite detector 64 detects another GPS pseudolite 20 in the vicinity when a received identification matches the identification of an unreceivable GPS satellite. The satellite identification selector 66 selects an available identification that both corresponds to one of the unreceivable GPS satellites and is not currently being used by another one of the GPS pseudolites 20. Preferably, the visibility calculator 74 calculates information for which of the out-of-view GPS satellites 24 have the longest time periods before they become in-view GPS satellites 16 and provides this information to the satellite identification selector 66. The satellite identification selector 66 then selects the identification for the out-of-view GPS satellite 24 having the longest time period that is available. The pseudolite GPS transmitter 48 then transmits a pseudo GPS signal having the selected available PRN code identification and location-determination information for the geographical location of the present GPS pseudolite 20. The GPS navigation receiver 20 determines a geographical location from the GPS signals and the pseudo GPS signals from the in-view GPS satellites 16 and the pseudolites 20, respectively. This method reduces the number of PRN codes that must be searched in the GPS receiver 12 to acquire a new pseudolite.

FIG. 3 is a table showing the PRN numbers 1–32 and the associated orbital slots of the allocated GPS satellites for the global positioning system as of Sep. 29, 1999. The alpha identification character of the slot, A through F, represents the six orbits for the GPS satellites 16, 24. The numeric identification character of the slot, 1 through 5, represents the five positions within the orbit. As of Sep. 29, 1999, PRN codes 11, 12, 20, 28, and 32 are non-operational. A current status of the operational GPS satellites is available from the United States government on-line at www.navcen.uscg.mil.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A pseudolite for a positioning system (PS), said positioning system having several orbiting PS satellites transmitting respective PS signals, each one of said PS signals having an identification for a one of said PS satellites transmitting said one of said PS signals and location-determination information corresponding to a location-in-space for said one of said PS satellites transmitting said one of said PS signals, the pseudolite comprising:

an availability calculator for determining unreceivable ones of said PS satellites;

an identification selector coupled to the availability calculator for selecting a particular one of said identifications corresponding to a particular one of said unreceivable PS satellites; and a transmitter coupled to the identification selector for transmitting a pseudo PS signal having said particular identification and location-determination information corresponding to a geographical location of the pseudolite.

2. The pseudolite of claim 1, wherein:

the availability calculator includes a visibility calculator for determining out-of-view ones of said PS satellites and designating said out-of-view PS satellites as said unreceivable PS satellites.

3. The pseudolite of claim 2, wherein:

said visibility calculator is for determining said out-of-view PS satellites based upon PS satellite orbital parameter information and time.

4. The pseudolite of claim 2, wherein:

said visibility calculator is for determining said out-of-view PS satellites based upon location information and height of a local obstruction.

5. The pseudolite of claim 1, wherein:

the availability calculator includes an operational identifier for determining non-operational ones of said PS satellites and designating said non-operational PS satellites as said unreceivable PS satellites.

6. The pseudolite of claim 1, wherein:

said PS satellites include GPS satellites for transmitting GPS signals as said PS signals having said identification in a form of a distinguishable pseudorandom spreading code.

7. The pseudolite of claim 1, wherein:

said PS satellites include global orbiting navigation system (GLONASS) satellites for transmitting GLONASS signals as said PS signals having said identification in a form of a distinguishable carrier frequency.

8. The pseudolite of claim 1, further comprising:

a pseudolite PS receiver for receiving signal energy for received ones of said PS signals having corresponding received ones of said identifications; and a pseudolite detector for preventing the identification selector from selecting any one of said received identifications as said particular identification.

9. The pseudolite of claim 1, wherein:

said pseudo PS signal is for reception by a PS navigation receiver for determining at least one of (i) location and (ii) time.

10. A method in a pseudolite for a positioning system (PS), said positioning system having several orbiting PS satellites transmitting respective PS signals, each one of said PS signals having an identification for a one of said s PS satellites transmitting said one of said PS signals and location-determination information corresponding to a location-in-space for said one of said PS satellites transmitting said one of said PS signals, the method comprising steps of:

determining unreceivable ones of said PS satellites;

selecting a particular one of said identifications corresponding to a particular one of said unreceivable PS satellites; and transmitting a pseudo PS signal having said particular identification and location-determination information corresponding to a geographical location of the pseudolite.

11. The method of claim 10, wherein:

the step of determining said unreceivable PS satellites includes steps of: determining out-of-view ones of said PS satellites; and designating said out-of-view PS satellites as said unreceivable PS satellites.

12. The method of claim 11, wherein:

the step of determining said out-of-view PS satellites includes determining said out-of-view PS satellites based upon PS satellite orbital parameter information and time.

13. The method of claim 11, wherein:

the step of determining said out-of-view PS satellites includes determining said out-of-view PS satellites based upon location and height of a local obstruction.

14. The method of claim 10, wherein:

the step of determining said unreceivable PS satellites includes steps of: determining non-operational ones of said PS satellites; and designating said non-operational PS satellites as said unreceivable PS satellites.

15. The method of claim 10, wherein:

said PS satellites include GPS satellites for transmitting GPS signals as said PS signals having said identification in a form of a distinguishable pseudorandom spreading code.

16. The method of claim 10, wherein:

said PS satellites include global orbiting navigation system (GLONASS) satellites for transmitting GLONASS signals as said PS signals having said identification in a form of a distinguishable carrier frequency.

17. The method of claim 10, further comprising steps of:

receiving signal energy for received ones of said PS signals having corresponding received ones of said identifications; and the step of selecting particular identification includes selecting said particular identification not corresponding to any one of said received identifications.

18. The method of claim 10, wherein:

said pseudo PS signal is for reception by a PS navigation receiver for determining at least one of (i) location and (ii) time.

* * * * *